United States Patent
Nagao et al.

(10) Patent No.: US 11,651,142 B2
(45) Date of Patent: May 16, 2023

(54) DISPLAY CONTROL SYSTEM, DISPLAY CONTROL METHOD, AND INFORMATION STORAGE MEDIUM

(71) Applicant: Cybozu, Inc., Tokyo (JP)

(72) Inventors: Hiroya Nagao, Tokyo (JP); Jun Hasegawa, Tokyo (JP); Kensuke Hayashi, Matsuyama (JP); Arisu Yano, Matsuyama (JP); Ryotaro Nakagawa, Matsudo (JP)

(73) Assignee: CYBOZU, INC., Tokyo (JP)

( * ) Notice: Subject to any disclaimer, the term of this patent is extended or adjusted under 35 U.S.C. 154(b) by 0 days.

(21) Appl. No.: 17/191,707

(22) Filed: Mar. 4, 2021

(65) Prior Publication Data
US 2021/0279405 A1 Sep. 9, 2021

(30) Foreign Application Priority Data
Mar. 6, 2020 (JP) .............................. JP2020-038767

(51) Int. Cl.
*G06F 40/14* (2020.01)
*G06F 40/177* (2020.01)

(52) U.S. Cl.
CPC ............ *G06F 40/14* (2020.01); *G06F 40/177* (2020.01)

(58) Field of Classification Search
CPC ................................. G06F 40/14; G06F 40/177
See application file for complete search history.

(56) References Cited

U.S. PATENT DOCUMENTS

| | | | | |
|---|---|---|---|---|
| 2005/0235216 | A1* | 10/2005 | Kawano | G06F 16/1774 715/751 |
| 2007/0208992 | A1* | 9/2007 | Koren | G06T 11/206 715/212 |
| 2009/0112990 | A1* | 4/2009 | Campbell | G06F 16/954 709/205 |
| 2013/0145245 | A1 | 6/2013 | Goldberg | |

OTHER PUBLICATIONS

"Google Spreadsheet-Free service for creating and editing spreadsheets online" (https://www.google.com/intl/ja_jp/sheets/about/) from Google dated Feb. 28, 2020 pp. 1-7 (Cited in the specification p. 1 line 17—p. 2 line 7.).
Yoshinori Kodate and "Dekiru" Series Editorial Department, "'Dekiru' Excel 2016", Impress Corporation, Nov. 1, 2015, First edition, pp. 78-79, pp. 260-267. (See partial Translation of the Office Action dated Sep. 29, 2020, for corresponding JP application No. 2020-038767.).
Office Action dated Sep. 29, 2020, for corresponding JP application No. 2020-038767 with partial English translation pp. 1-3.

* cited by examiner

*Primary Examiner* — Keith D Bloomquist
(74) *Attorney, Agent, or Firm* — HEA Law PLLC

(57) ABSTRACT

A display control system includes at least one processor that obtains shared information shared by a plurality of users, obtains individual setting information specified by a display-request user among the plurality of users, the display-request user being a user who requests display of the shared information, the individual setting information being related to an individual display setting of the display-request user, and displays the shared information on a display of the display-request user based on the individual setting information.

11 Claims, 6 Drawing Sheets

DT

| SHARED INFORMATION ID | INDIVIDUAL SETTING INFORMATION | |
|---|---|---|
| | FIELD NAME | COLUMN WIDTH |
| i00001 | PLANNING DEPARTMENT RECORD NO. | 70 |
| | PLAN NAME | 45 |

| GROUP ID | SHARED INFORMATION ID | ADMINISTRATIVE USER ID | COMMON SETTING INFORMATION || SHARED INFORMATION | ... |
| --- | --- | --- | --- | --- | --- | --- |
| | | | FIELD NAME | COLUMN WIDTH | | |
| g00001 | i00001 | u00001 | No | 10 | ACTUAL DATA A | ... |
| | | | CONTROL NO. | 40 | | |
| | | | PLANNING DEPARTMENT RECORD NO. | 80 | | |
| | | | CLIENT CONTROL NO. | 70 | | |
| | | | PLAN NAME | 30 | | |
| | | | CATEGORY | 35 | | |
| | | | APPROVAL DEADLINE | 45 | | |
| | | | ⋮ | ⋮ | | |
| g00002 | i00002 | u00075 | REFERENCE NO. | 30 | ACTUAL DATA B | ... |
| | | | NAME OF INVENTION | 50 | | |
| | | | APPLICATION NO. | 40 | | |
| | | | APPLICATION DATE | 30 | | |
| | | | APPLICANT | 35 | | |
| | | | ⋮ | ⋮ | | |
| ⋮ | ⋮ | ⋮ | ⋮ | ⋮ | ⋮ | ⋮ |

| SHARED | INDIVIDUAL SETTING INFORMATION ||
| INFORMATION ID | FIELD NAME | COLUMN WIDTH |
| --- | --- | --- |
| i00001 | PLANNING DEPARTMENT RECORD NO. | 70 |
| | PLAN NAME | 45 |

DISPLAY CONTROL SYSTEM, DISPLAY CONTROL METHOD, AND INFORMATION STORAGE MEDIUM

CROSS-REFERENCE TO RELATED APPLICATION

The present disclosure contains subject matter related to that disclosed in Japanese Patent Application JP2020-038767 filed in the Japan Patent Office on Mar. 6, 2020 the entire contents of which are hereby incorporated by reference.

BACKGROUND OF THE INVENTION

1. Field of the Invention

The embodiments disclosed herein relate to a display control system, a display control method, and an information storage medium.

2. Description of the Related Art

A system for sharing information among a plurality of users has been known. For example, "Google Spreadsheet-Free service for creating and editing spreadsheets online" (https://www.google.com/intl/ja_jp/sheets/about/) describes a system for displaying information in a tabular format shared by a plurality of users. In this system, a display setting common to multiple users is employed, and each user can change the display setting.

However, in the above technique, when a user A changes some of the column widths, such change is also applied to another user B, so the display setting may be difficult for the user B to use. For example, suppose that the user A uses a horizontally long screen and user B uses a vertically long screen. If the user A expands the column width to easily view the shared information on the user A's horizontally long screen, the screen may be difficult to view for the user B who uses a narrow-width screen.

SUMMARY OF THE INVENTION

An object of one aspect of the present disclosure is to display shared information in a display setting according to a user.

A display control system according to one aspect of the present disclosure includes at least one processor configured to obtain shared information shared by a plurality of users, obtain individual setting information specified by a display-request user among the plurality of users, the display-request user being a user who requests display of the shared information, the individual setting information being related to an individual display setting of the display-request use, and display the shared information on a display of the display-request user based on the individual setting information.

DESCRIPTION OF THE EMBODIMENTS

[1. Overall Configuration of Display Control System]

Figure 1:
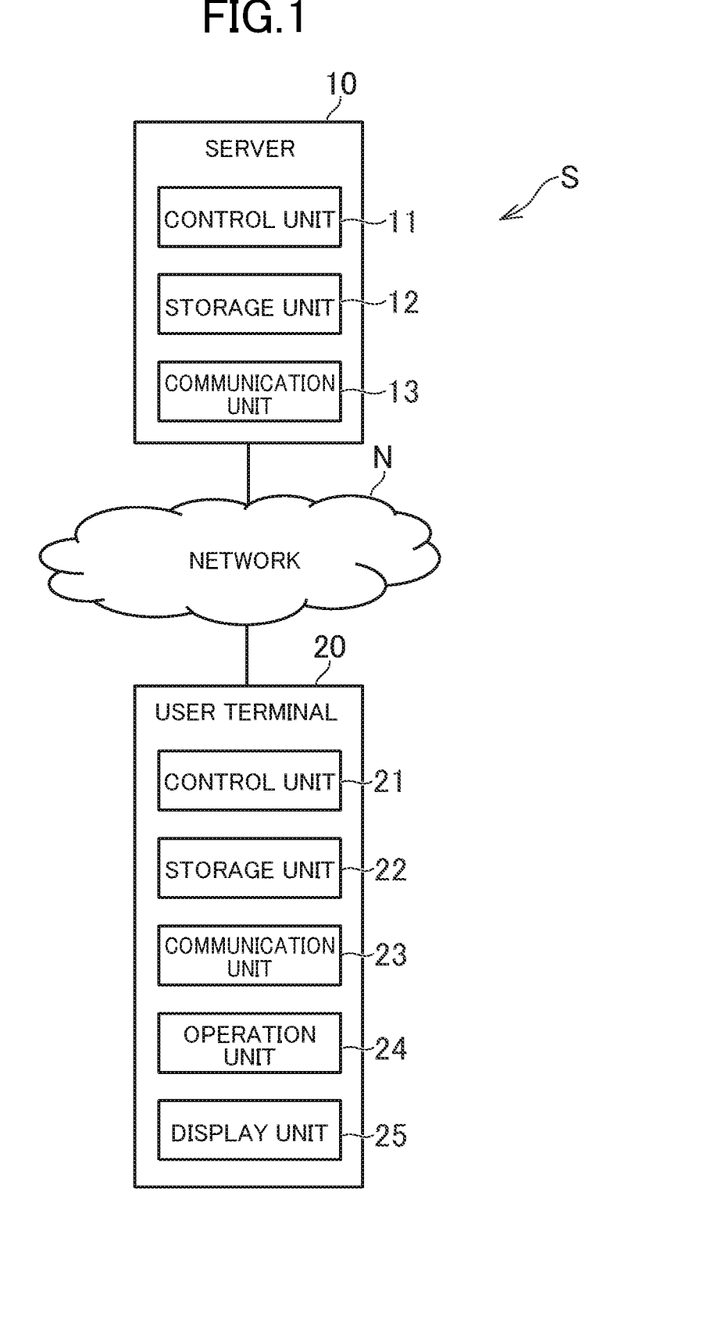
FIG. 1 is a diagram illustrating an example of an overall configuration of a display control system.

Hereinafter, a display control system according to the present disclosure will be described. FIG. 1 is a diagram illustrating an example of an overall configuration of the display control system. As shown in FIG. 1, the display control system S includes a server 10 and a user terminal 20. Each of the server 10 and the user terminal 20 is connected to a network N, such as the Internet. FIG. 1 shows one user terminal 20, although there are a plurality of user terminals 20 respectively corresponding to a plurality of users. One user may use a plurality of user terminals 20. There may also be a plurality of servers 10.

The server 10 is a server computer. The server 10 includes a control unit 11, a storage unit 12, and a communication unit 13. The control unit 11 includes at least one processor. The storage unit 12 includes a RAM and a hard disk, and stores various programs and data. The control unit 11 executes various processing based on the programs and data. The communication unit 13 includes communication interfaces such as a network card and various communication connectors, and communicates with other devices.

The user terminal 20 is a computer operated by a user. For example, the user terminal 20 is a personal computer, a tablet terminal, or a smart phone. The user terminal 20 includes a control unit 21, a storage unit 22, a communication unit 23, an operation unit 24, and a display unit 25. The hardware configurations of the control unit 21, the storage unit 22, and the communication unit 23 may be respectively the same as those of the control unit 11, the storage unit 12, and the communication unit 13. The operation unit 24 is an input device, such as a mouse and a keyboard. The display unit 25 is a liquid crystal display or an organic EL display, for example, and displays various screens according to instructions of the control unit 21.

The program and data described as being stored in each of the server 10 and the user terminal 20 may be supplied via a network. The hardware configurations of the server 10 and the user terminal 20 are not limited to the above examples, and various types of hardware can be applied. For example, a reading unit (e.g., an optical disk drive or a memory card slot) for reading a computer-readable information storage medium or an input/output unit (e.g., a USB terminal) for directly connecting to an external device may be included. In this case, the program and the data stored in the information storage medium may be supplied via the reading unit or the input/output unit.

[2. Outline of Display Control System]

In the display control system S, shared information is shared by a plurality of users. The shared information is information provided to multiple users. Each of the users can access the shared information, and at least can view or update the shared information. The shared information may include any content, for example, text, number, table, diagram, image, video, audio, or a combination of two or more of these.

In this embodiment, two or more users belong to the same user group, and the shared information is shared within the user group. The user group is a group of users, such as, a department of a company, a team, or a group of friends. Any user belonging to the user group creates the shared information and registers the information on the server 10. All users belonging to the user group may have the authority to edit the shared information, or only some users may have the authority to edit the shared information and other users may have only the authority to view the shared information.

A user belongs to at least one user group. When the user logs in to the display control system S, the user can display the shared information of the user group, to which the user belongs, on the user terminal 20. The user group shares at least one piece of shared information. When the user selects the shared information to display, a display screen for displaying the selected shared information is displayed on the user terminal 20.

Figure 2:
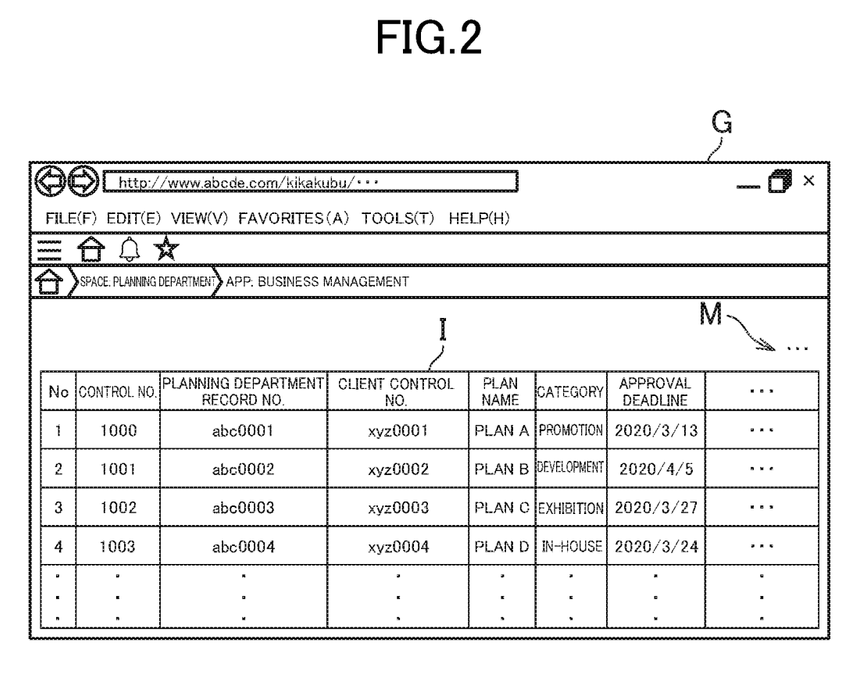
FIG. 2 is a diagram illustrating an example of a display screen displayed on a user terminal.

FIG. 2 is a diagram illustrating an example of a display screen displayed on the user terminal 20. In this embodiment, a case will be described in which a display screen G is displayed on the browser, although the browser may not be used. At least one browser is installed in the user terminal 20. In the present embodiment, a plurality of browsers are installed in the user terminal 20, and the user selects one of the browsers to display the display screen G.

As shown in FIG. 2, the shared information I is displayed on the display screen G in a tabular format (table format). The table includes at least one row and one column. The first row of each column displays field names. Each row shows content of each record included in the shared information. When the shared information I is created, the default column width and row width are set. The default column width and row width may be fixed values or may be set to a length corresponding to the field name.

In this embodiment, at least one user belonging to the user group is set as an administrative user. The administrative user manages the user group. For example, the administrative user manages the users belonging to the user group, the shared information shared by the user group, and the display settings of the shared information. In this embodiment, the management of the display setting of the shared information will be described.

The display setting is a setting of a display mode of (how to display) the shared information. The display setting can also be referred to as display layout or design setting. For example, the display setting may be a column width, row width, and field arrangement of a table, font, color, and size of characters, information alignment, string orientation, margins, columns, backgrounds, or a combination of two or more of these. In this embodiment, the column width of the table will be described as an example of the display setting. As such, the description of the column width in this embodiment can be replaced with the display setting.

For example, the administrative user may operate the operation unit 24 to adjust the column widths. The operation for adjusting the column width may be any operation. For example, if the operation unit 24 is a mouse, the administrative user may place a cursor at the edge of the cell (column divider) where the administrative user wishes to adjust the column width. The administrative user presses a left button of the mouse while moving the mouse left and right to adjust the column width. The column width is fixed when the administrative user releases the left button of the mouse. The same applies to input devices other than the mouse, and the column width can be adjusted by any operation.

When the administrative user selects a menu icon M, a menu for saving the column width of shared information I is displayed. When the administrative user selects the phrase "save column width" from the menu, the column width of the shared information I (the column width of the table being displayed) is stored in the server 10. The column width stored in the server 10 (column width adjusted by the administrative user) becomes a common display setting in the user group. As such, the column width adjusted by the administrative user also apply to other users.

In this regard, a screen size of the display unit 25 may vary depending on the user, and some of the users may want to display the shared information I with a column width different from the column width adjusted by the administrative user. As such, in this embodiment, a column width adjusted individually by a user who is not the administrative user is set to the display setting exclusively for such a user. If a user individually adjusts a column width of a field, the field is displayed by the adjusted column width. Other fields are displayed with column widths adjusted by the administrative user.

In the example of FIG. 2, when a user adjusts the column widths of the "planning department record number" and the "plan name", these two fields are displayed by the column widths adjusted by the user. These column widths may be adjusted before or after the adjustment by the administrative user. These two column widths do not apply to other users. Other fields, such as "control number", are displayed with column widths adjusted by the administrative user because the user has not adjusted the column widths. As described above, in the display control system S, the shared information is displayed by the display setting corresponding to the user. In the following, details of the display control system S will be described.

[3. Functions Implemented in Display Control System]

Figure 3:
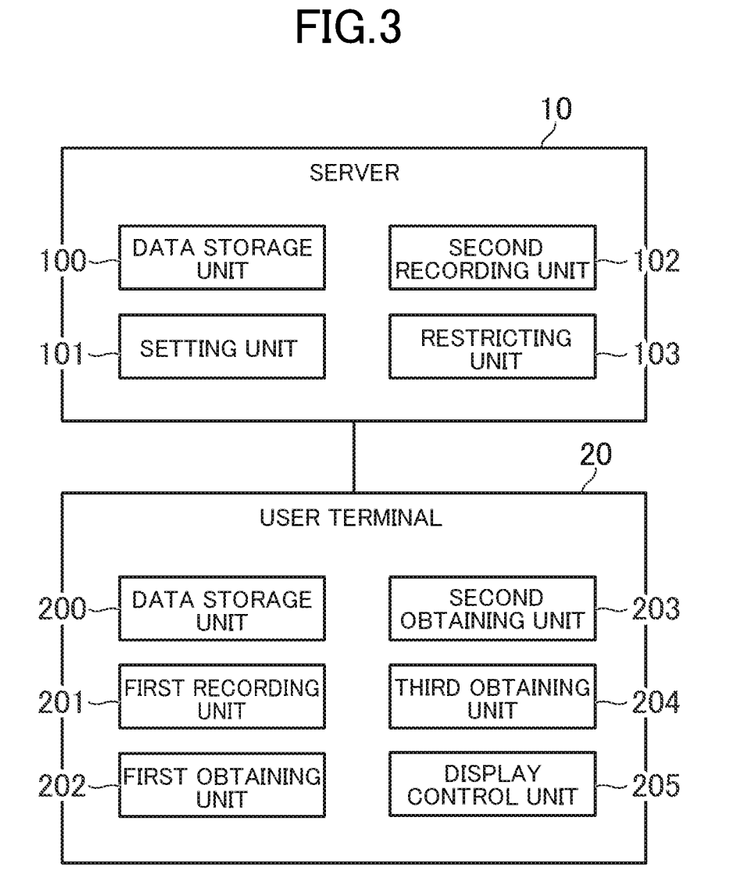
FIG. 3 is a functional block diagram showing functions implemented in the display control system.

FIG. 3 is a functional block diagram showing functions implemented in the display control system S. In the present embodiment, the functions implemented by the server 10 and the user terminal 20 will be described.

[3-1. Functions Implemented by Server]

As shown in FIG. 3, the server 10 includes a data storage unit 100, a setting unit 101, a second recording unit 102, and a restricting unit 103.

[Data Storage Unit]

The data storage unit 100 is implemented mainly by the storage unit 12. The data storage unit 100 stores the data required for the server 10 to perform the processing described in this embodiment. In this embodiment, as an example of such data, a shared information database will be described.

Figure 4:
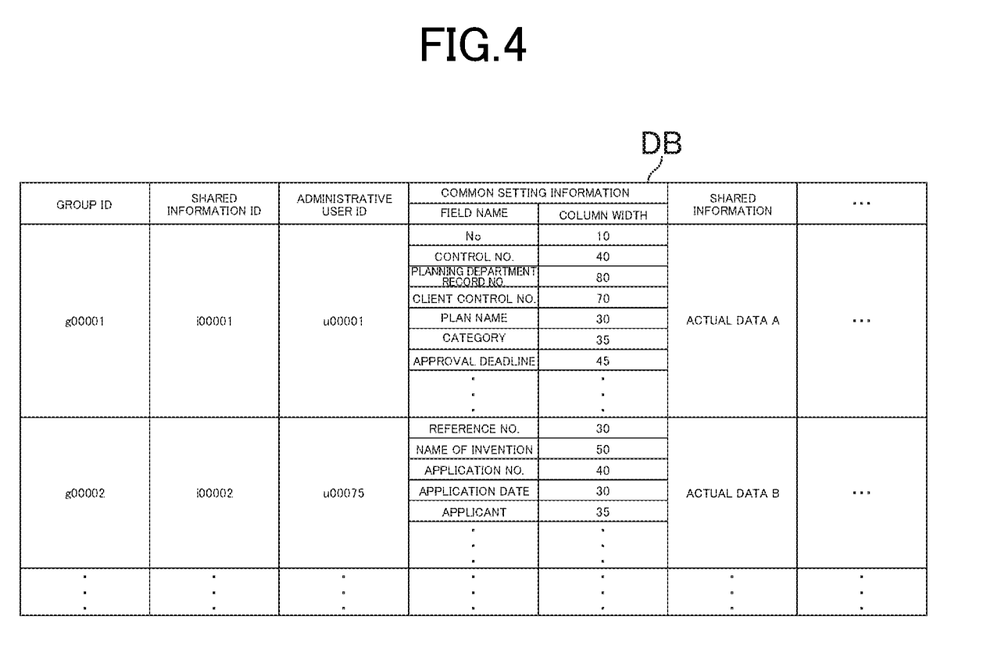
FIG. 4 is a diagram illustrating an example of data storage of a shared information database.

FIG. 4 is a diagram illustrating an example of data storage of the shared information database. As shown in FIG. 4, the shared information database DB is a database in which shared information is stored. For example, the shared information database DB stores group ID, shared information ID, administrative user ID, common setting information, and actual data of shared information.

The group ID uniquely identifies a user group that shares shared information. The shared information ID is an ID that uniquely identifies shared information. The administrative user ID is a user ID of the administrative user. In this embodiment, an administrative user is set for each user group, although an administrative user may be set for each shared information. The user ID is an ID that uniquely identifies a user.

The common setting information is information related to the display setting common to a plurality of users belonging to the user group. The common display setting is the same display setting for one user and other users belonging to the user group. The common setting information corresponds to a plurality of users, and thus there is a one-to-many relationship between the common setting information and the users. In this embodiment, the column width is specified as the display setting, and thus the common setting information indicates a name of each of the fields included in the shared information and its column width. That is, the common setting information indicates a column width for each field of the shared information. For example, the common setting information can be edited by the administrative user. Other users without administrative authority cannot edit the common setting information.

The actual data of the shared information is data indicating content of the shared information. Instead of the actual data of the shared information, a path to the actual data may be stored in the shared information database DB. In this embodiment, the shared information is displayed in a tabular format, and thus the actual data of the shared information indicates content of each record.

The data stored in the data storage unit 100 is not limited to the examples described above. The data storage unit 100 may store any data. For example, the data storage unit 100 may store a user database that stores information about each user. The user database stores a user group ID, user ID, user name, and authentication information, for example. The individual setting information described later may be stored in the server 10 instead of the user terminal 20, and in this case, the individual setting information may be stored in the user database.

[Setting Unit]

The setting unit 101 is mainly implemented by the control unit 11. The setting unit 101 sets the common setting information based on the operation of the administrative user who is authorized to set the common setting information among the plurality of users. In the present embodiment, the content of the common setting information is specified by the administrative user, and thus the setting unit 101 obtains the content specified by the administrative user from the user terminal 20 of the administrative user. For example, the setting unit 101 obtains a name of each field of the shared information I displayed on the user terminal 20 of the administrative user and its column width. The setting unit 101 generates common setting information in which a name of each field is associated with its column width.

[Second Recording Unit]

The second recording unit 102 is mainly implemented by the control unit 11. The second recording unit 102 records the common setting information in the server 10. In the present embodiment, the common setting information is managed in the shared information database DB stored in the data storage unit 100, and thus the second recording unit 102 stores the common setting information set by the setting unit 101 in the shared information database DB. For example, the second recording unit 102 stores the common setting information set by the setting unit 101 in association with the shared information ID of the shared information I in which the administrative user specifies the content of the common setting information.

[Restricting Unit]

The restricting unit 103 is mainly implemented by the control unit 11. The restricting unit 103 restricts the setting of the common setting information by the operation of users other than the administrative user. For example, the other users are users belonging to the same user group as the administrative user and are not the administrative user. Further, for example, the other users are users who are not belonging to the user group to which the administrative user belongs.

Restricting the setting of the common setting information is prohibiting the common setting information being set by the operation of the other users. For example, the restricting unit 103 does not permit the other users to perform operations for setting the common setting information, and permits only the administrative user. The restricting unit 103 does not display an image for setting the common setting information (in the example of FIG. 2, the phrase "save column width" in the menu of the menu icon M) on the user terminals 20 of the other users. Further, for example, the operation for setting the common setting information may be permitted to the other users, but the restricting unit 103 prevents the common setting information based on the operation of the other users from being stored in the shared information database DB even if the other users perform such operation.

[3-2. Functions Implemented in User Terminal]

As shown in FIG. 3, in the user terminal 20, a data storage unit 200, a first recording unit 201, a first obtaining unit 202, a second obtaining unit 203, a third obtaining unit 204, and a display control unit 205 are implemented.

[Data Storage Unit]

The data storage unit 200 is implemented mainly by the storage unit 22. The data storage unit 200 stores the data required for the user terminal 20 to perform the processing described in this embodiment. In this embodiment, an individual setting data DT will be described as an example of such data.

Figure 5:
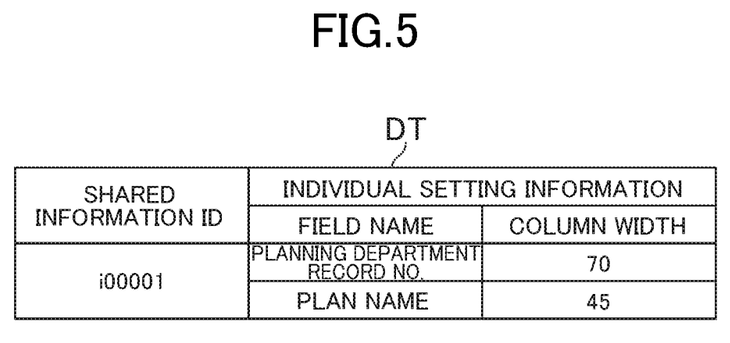
FIG. 5 is a diagram illustrating an example of data storage of individual setting data.

FIG. 5 is a diagram illustrating an example of data storage of the individual setting data DT. As shown in FIG. 5, the shared information ID and the individual setting information are stored in the individual setting data DT. The individual setting information is information about the user's individual display setting. The user's individual display setting is a display setting that is not applied to other users. In other words, the individual display setting for the user is a display setting that is applied only to such a user.

For example, the individual setting information indicates at least one of a column width and a row width specified by the user. The individual setting information corresponds to one user, and thus the individual setting information and the user has a one-to-one relationship. In this embodiment, a column width is adjusted by a user, so the individual setting information indicates the column width specified by the user. For example, the individual setting information indicates a name of a field with the column width specified by the user and its column width. The individual setting information indicates a column width for each field for which the user specifies a column width. The individual setting information does not store a name and a column width of a field for which the user does not specify a column width (field for which a column width is not adjusted).

The user can specify all the display settings of the shared information, although in this embodiment, a case will be described in which only a part of the display settings is specified. As such, the individual setting information may be referred to as, of the shared information, information related to a display setting of a portion specified by a display-request user. The individual setting information includes identification information indicating such a specified portion of the shared information. In the present embodiment, a name of a field is described as an example of the identification information, although the identification information may be other information, such as an ID that uniquely identifies a column. If the shared information is displayed in a tabular format as in this embodiment, the individual setting information includes names of some of the fields for which column widths are specified by the display-request user and their column widths.

For example, the individual setting data DT shown in FIG. 5 may be stored by using a Cookie of browsers or not by using a Cookie. In this embodiment, the individual setting information is associated with each of the browsers used by the users. For example, the data storage unit 200 stores individual setting data DT for each browser. For this reason, content of the individual setting information may differ even for the same shared information depending on the browser.

The individual setting data DT of each browser need not be separated as in this embodiment, and the data may be integrated. FIG. 5 shows the individual setting information of one piece of shared information, although if a column width of each of the plurality pieces of shared information is adjusted on the same browser, the individual setting information stores shared information IDs and the individual setting information of the plurality of pieces of shared information.

The data stored in the data storage unit 200 is not limited to the above-described example. The data storage unit 200 may store any data. For example, the data storage unit 200 may store the common setting information of the shared information of the user group to which the user belongs. In this case, it is assumed that the common setting information is consistent between the server 10 and the user terminal 20.

[First Recording Unit]

The first recording unit 201 is mainly implemented by the control unit 21. The first recording unit 201 records individual setting information in a user terminal 20 of a display-request user. The display-request user is a user who requests display of the shared information. In other words, the display-request user may be a user of the user terminal 20 where each function is implemented or a user of the user terminal 20 where the shared information is displayed.

The first recording unit 201 sets the individual setting information based on the operation of the display-request user. For example, the first recording unit 201 obtains, of the shared information I displayed on the user terminal 20, a name of a field, for which the display-request user specifies a column width, and its column width. The first recording unit 201 generates individual setting information associating a name of each field with its column width. The first recording unit 201 records, in the data storage unit 200, the shared information ID of the shared information for which the column width is adjusted and the generated individual setting information in association with the individual setting data DT.

[First Obtaining Unit]

The first obtaining unit 202 is mainly implemented by the control unit 21. The first obtaining unit 202 obtains shared information that is shared by a plurality of users. In this embodiment, the shared information is stored in the data storage unit 100, and thus the first obtaining unit 202 obtains the shared information stored in the data storage unit 100. In this embodiment, a plurality of users share a plurality of pieces of shared information, and the first obtaining unit 202 obtains selected shared information from the plurality of pieces of shared information.

The selected shared information is shared information to be displayed among a plurality of pieces of shared information shared by the display-request users. Here, to select has the same meaning as to specify or set. The selection may be performed by the user or automatically performed by processing of the program. The selected shared information is selectable by any method, and, for example, may be selected by the display-request user. For example, the selected shared information selected by the administrative user may be shared information to be displayed by default. Further, for example, the shared information selected by another user who has sent a message to the display-request user may correspond to the selected shared information. The first obtaining unit 202 transmits the shared information ID of the selected shared information to the server 10. The server 10 refers to the shared information database DB, obtains actual data of the selected shared information associated with the shared information ID, and transmits the obtained data to the user terminal 20. The first obtaining unit 202 obtains the selected shared information of which the actual data has been transmitted.

[Second Obtaining Unit]

The second obtaining unit 203 is mainly implemented by the control unit 21. The second obtaining unit 203 obtains the individual setting information that is specified by a display-request user, among the plurality of users, and is related to the individual display setting of the display-request user. Here, to specify may also be referred to as to adjust or set. The display-request user specifies content of the individual setting information.

In the present embodiment, the individual setting information is stored in the data storage unit 200 of the user terminal 20, and thus the second obtaining unit 203 obtains the individual setting information stored in the user terminal 20. The second obtaining unit 203 obtains a shared information ID of the selected shared information and obtains individual setting information associated with the shared information ID from the individual setting data DT.

In this embodiment, the individual setting information is associated with each of the plurality of pieces of shared information, and the second obtaining unit 203 obtains individual setting information associated with the selected shared information. The second obtaining unit 203 identifies a shared information ID of the selected shared information based on a detected signal of the operation unit 24, and obtains the individual setting information associated with the shared information ID from the individual setting data DT.

In the present embodiment, the individual setting information is associated with each of the plurality of browsers, and thus the second obtaining unit 203 obtains individual setting information associated with the browser selected by the display-request user among the plurality of browsers. The browser selected by the display-request user is a browser for displaying the display screen G. The second obtaining unit 203 obtains the individual setting information stored in the individual setting data DT associated with the running browser.

[Third Obtaining Unit]

The third obtaining unit 204 is mainly implemented by the control unit 21. The third obtaining unit 204 obtains the common setting information related to the display setting of the shared information common to the plurality of users. In this embodiment, the common setting information is stored in the server 10, and thus the third obtaining unit 204 obtains the common setting information stored in the server 10. The third obtaining unit 204 transmits the shared information ID of the selected shared information to the server 10. The server 10 refers to the shared information database DB, obtains the common setting information associated with the shared information ID, and transmits the common setting information to the user terminal 20. The third obtaining unit 204 obtains the transmitted common setting information.

[Display Control Unit]

The display control unit 205 is mainly implemented by the control unit 21. The display control unit 205 displays the shared information on the display unit 25 of the display-request user based on the individual setting information. The display control unit 205 determines a display setting of the shared information based on the individual setting information, and displays the shared information by the determined display setting. In this embodiment, a name of a field, for which a column width is specified by the display-request user, and its column width are indicated in the individual setting information, and thus the display control unit 205 determines the column width of the name of the field indicated by the individual setting information as the column width indicated by the individual setting information.

In a case where the display-request user specifies column widths for all pieces of shared information (i.e. in a case where the column widths of the all fields are adjusted), the display control unit 205 does not use the common setting information but displays the shared information based on the individual setting information. If the display-request user specifies the column width only for a portion of the shared information (if only the column widths of some fields are adjusted), the display control unit 205 displays such a portion of the shared information based on the individual setting information and displays the other portion based on the common setting information. This portion can be freely specified by the display-request user.

In the present embodiment, the individual setting information includes identification information indicating the above-described portion, and the display control unit 205 specifies the portion based on the identification information, and specifies the portion of the shared information, for which the identification information is not included in the individual setting information, as other portion. In the example of data storage of FIG. 5, the name of the field corresponds to the identification information, and the display control unit 205 specifies the column in which a name of a field is stored in the individual setting information (the column of the "planning department record number" and the "plan name") as the portion described above. The display control unit 205 specifies a column in which a name of a field is not stored in the individual setting information as another portion. The display control unit 205 refers to the shared information or the common setting information and specifies the name of the field of the other portion. The display control unit 205 specifies the other portion based on the difference between the name of the field indicated in the shared information or the common setting information and the name of the field indicated in the individual setting information.

In the present embodiment, the individual setting information is associated with each of the plurality of browsers, and thus the display control unit 205 displays the shared information on the display unit 25 based on the individual setting information associated with the browser selected by the display-requesting user. The individual setting information associated with the selected browser is used for displaying the shared information. In the present embodiment, the individual setting information is associated with each of the plurality of pieces of shared information, and thus the display control unit 205 displays the selected shared information on the display unit 25 based on the individual setting information associated with the selected shared information. The individual setting information associated with the selected shared information is used to display the share information.

[4. Processing Executed by Display Control System]

Figure 6:
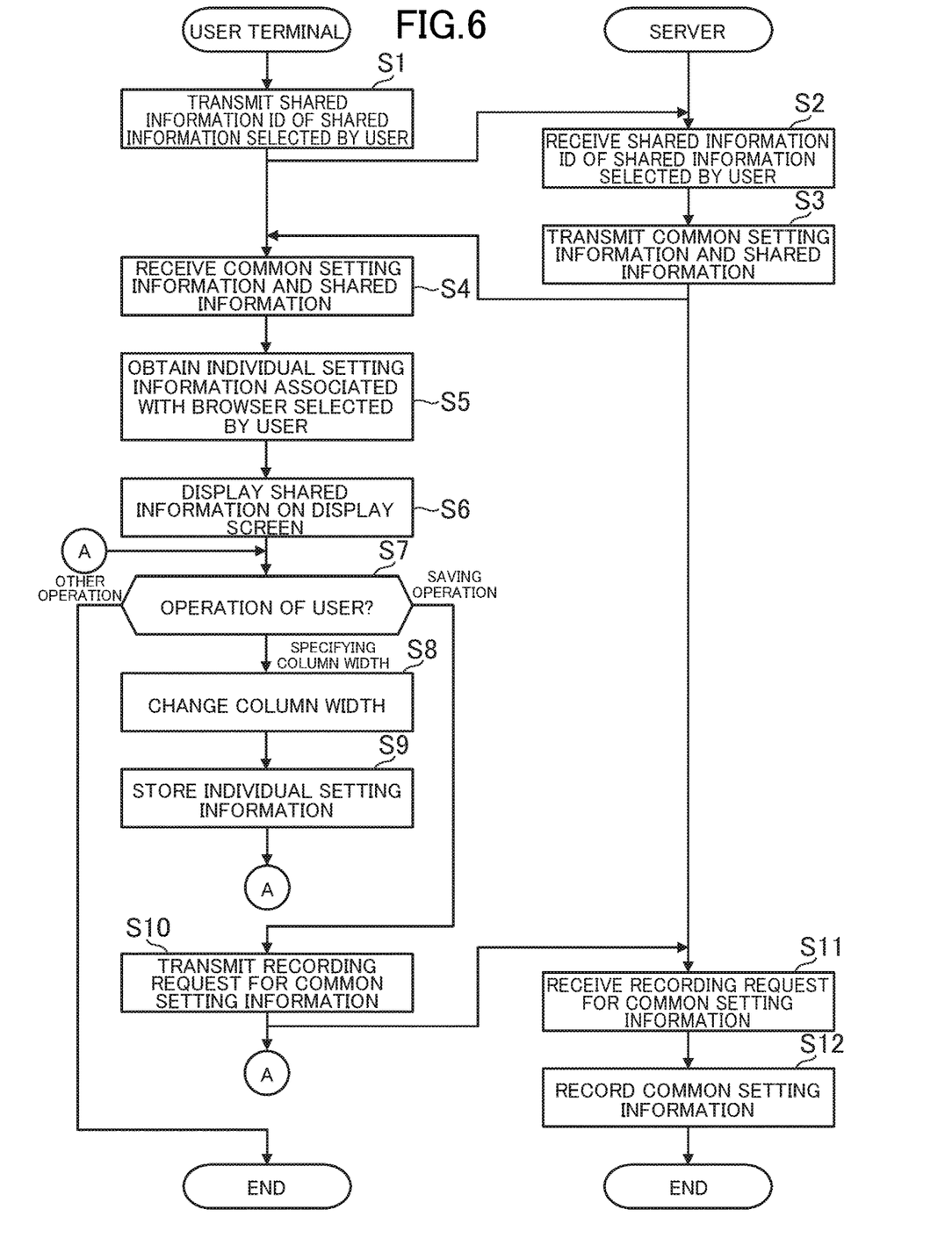
FIG. 6 is a flow chart showing an example of processing executed by the display control system.

Next, processing executed by the display control system S will be described. FIG. 6 is a flow chart showing an example of the processing executed by the display control system S. The processing shown in FIG. 6 is an example of processing executed by the functional blocks shown in FIG. 3. When the processing of FIG. 6 is executed, it is assumed that a user has already logged in to the server 10.

As shown in FIG. 6, the user terminal 20 transmits a shared information ID of the shared information selected by the user to the server 10 (S1). For example, a list of displayable shared information is displayed on the display unit 25, and the user selects any shared information from the list. Assume that a shared information ID of each shared information is included in the data for displaying the list. The shared information to be displayed may be selected not from the list but from links included in messages from other users.

The server 10 receives, from the user terminal 20, the shared information ID of the shared information selected by the user (S2). The server 10 refers to the shared information database DB and transmits the common setting information, which are associated with the shared information selected by the user, and the shared information to the user terminal 20 (S3). In S3, the server 10 obtains and transmits the common setting information that is stored in the same record as the shared information ID received from the user terminal 20 and the shared information.

The user terminal 20 receives the common setting information and the shared information from the server 10 (S4). The user terminal 20 obtains the individual setting information associated with the browser selected by the user (S5). For example, if the individual setting information is stored in the cookie of the browser, the user terminal 20 obtains the individual setting information stored in the cookie of the browser being displayed.

The user terminal 20 displays the shared information on the display screen G based on the common setting information and the individual setting information (S6). In S6, the user terminal 20 determines a column width of a column including a field name in the individual setting information as the column width of such a column. The user terminal 20 determines a column width of other column included in the common setting information as the column width of the other column. The user terminal 20 creates a table of these determined column widths, and sets values of respective records included in the shared information to the cells.

The user terminal 20 specifies operation of the user based on the detected signal of the operation unit 24 (S7). Here, a case will be described in which operation for specifying a column width of the shared information I, operation for storing the common setting information, or other operation is performed. Assume that operation for saving the common setting information is performed only by the administrative user. The other operation is operation for changing a value of a cell or operation for closing the display screen G, for example.

When the operation for specifying a column width is performed (S7; specifying column width), the user terminal 20 changes the column width in the table of the shared information I based on the operation of the user (S8). The user terminal 20 stores the individual setting information in the individual setting data DT in association with the shared information being displayed and the browser being selected (S9). In S9, the user terminal 20 stores, in the individual setting information, the field name of the column, for which the user specifies a column width, and its column width in association with each other. If the field name is not stored in the individual setting information, a combination of a field name and a column width is newly added to the individual setting information. When the selected browser does not have the individual setting data DT itself, the individual setting data DT is newly generated.

In S7, if the common setting information is stored by the administrative user (S7; saving operation), the user terminal 20 transmits a request for recording the common setting information to the server 10 (S10). The recording request is performed by transmitting data in a predetermined format. The recording request includes the names of all fields of the displayed shared information I and their column widths. For a user who is not the administrative user, the menu icon M does not include the phrase "save column width", and thus the processing of S10 to S12 is restricted so as not to be executed.

The server 10 receives the recording request of the common setting information from the user terminal 20 (S11). The server 10 records the common setting information based on the recording request (S12). In S12, in the shared information database DB, the server 10 stores a combination of the field name and the column width included in the recording request in the common setting information stored in the record of the shared information ID of the shared information being displayed. If there is no common setting information, new common setting information is generated.

If other operation is performed in S7 (S7; other operation), the processing terminates. In this case, processing according to the other operation performed by the user is executed. For example, when the operation for changing a value of a cell is performed, the user terminal 20 changes the value of the cell based on the operation. As another example, when the operation for closing the display screen G is performed, the user terminal 20 closes the browser or the tab on which the display screen G is displayed.

The display control system S described above displays the shared information on the user terminal 20 based on the individual setting information, thereby displaying the shared information by the display setting according to the user. For example, if a display setting adjusted by a user is reflected to other user, the other user may have difficulty to use the screen. In this regard, if the display setting corresponds to each user, the screen can be made easy to use for each user.

The shared information is displayed in a table format, and the individual setting information indicates the column width specified by the user. This allows the shared information in a table format to be displayed in a display setting according to the user.

The portion of the shared information for which the user specifies the column width based on the individual setting information is displayed and the other portion is displayed based on the common setting information. This enables to display the shared information on a user-friendly screen even if the user only specifies the column width of the portion. The user does not have to specify all the column widths, but only some of the column widths the user cares about, which can improve user convenience.

The portion for which the user specifies the column width is specified based on the identification information included in the individual setting information, and the portion of the shared information that does not include the identification information in the individual setting information is specified as another portion. This can accurately specify the portion specified by the user.

The individual setting information is stored in the user terminal 20 and the common setting information is stored in the server 10, which allows the individual setting information and the common setting information to be managed in a distributed manner. This can reduce the memory consumption of the server 10.

The common setting information is set based on the operation of the administrative user and is not set based on the operation of the other user, which can prevent the user without the administrative authority from freely changing the common setting information. This makes the screen easy to view for all the users in the user group.

The shared information is displayed based on the individual setting information associated with the browser selected by the display-request user, which allows the shared information of the column width corresponding to the browser to be displayed. This enables to display a screen according to the characteristics of the browser, which makes the screen easier to view.

The individual setting information is associated with each of the plurality of pieces of shared information. This can make the screen easy to view according to the shared information to be displayed.

[5. Variations]

The present disclosure is not to be limited to the above described embodiment. The present disclosure can be changed as appropriate without departing from the spirit of the invention.

For example, in the embodiment, when the display-request user changes the column width, such change is immediately reflected in the individual setting information. However, in the same way as the common setting information, the column width may be reflected in the individual setting information when the phrase such as "save setting" of the menu icon M is selected. Further, for example, when the administrative user changes the column width, such change may be immediately reflected in the common setting information without selecting the phrase such as "save setting" of the menu icon M.

For example, even when the user of the individual setting information uses a plurality of browsers, one piece of individual setting information common to the plurality of browsers may be used. For example, a user other than the administrative user may specify the common setting information. Also, for example, the user group may not have an administrative user. Further, for example, the shared information may be shared by an unspecified number of users without setting the user group. For example, for the administrative user, the display screen G may be displayed based on the common setting information and the individual setting information may not be provided.

For example, the case where the column width is adjusted has been described, although a row width may be adjusted, or both a column width and a row width may be adjusted. For example, the shared information may be displayed in any format other than a tabular format. If the shared information is displayed in a document data format, the display setting may be font and size of text, for example. Similarly, other formats may be set according to the format of the shared information.

For example, each of the functions described above may be implemented by any unit in the display control system S. For example, the functions described as being implemented by the server 10 may be implemented by the user terminal 20. Further, for example, the functions described as being implemented by the user terminal 20 may be implemented by the server 10. Further, for example, the functions may be implemented by one computer instead of being shared by a plurality of computers. In other words, it should be understood by those skilled in the art that various modifications, combinations, sub-combinations and alterations may occur depending on design requirements and other factors insofar as they are within the scope of the appended claims or equivalents thereof.

The invention claimed is:

1. A display control system comprising at least one processor configured to:
 obtain shared information shared by a first user and a second user;
 obtain common setting information related to a display setting of the shared information and common to the first user and the second user,
 obtain first individual setting information specified by the first user, the first individual setting information being related to a first display setting of a first part of the shared information;
 obtain second individual setting information specified by the second user, the second individual setting information being related to a second display setting of a second part of the shared information;
 cause to be displayed on a first display of the first user, the first part being based on the first individual setting information;
 cause to be displayed on the first display of the first user, a third part of the shared information based on the common setting information, the third part being a part other than the first part;
 cause to be displayed on a second display of the second user the second part being based on the second individual setting information; and
 cause to be displayed on the second display of the second user, a fourth part of the shared information being based on the common setting information, the fourth part being a part other than the second part,
 wherein the first part and the third part, displayed on the first display, and the second part and the fourth part displayed on the second display, are configured to be displayed at a same time;
 wherein the first individual setting information is associated with each of a plurality of browsers used by the first user wherein the first individual setting information is different for each browser, and
 the at least one processor is configured to:
 obtain the first individual setting information associated with a browser selected by the first user among the plurality of browsers, and
 cause to be displayed the shared information on the first display based on the first individual setting information associated with the browser selected by the first user.

2. The display control system according to claim 1, wherein
 the shared information is displayed in a tabular format, and
 the first individual setting information indicates at least one of a column width or a row width specified by the first user.

3. The display control system according to claim 1, wherein
 the first individual setting information includes identification information indicating the first part of the shared information, and
 the at least one processor is configured to identify the first part based on the identification information, and identify the third part of the shared information that does not include the identification information in the first individual setting information as the third part.

4. The display control system according to claim 1, wherein the at least one processor is configured to:
 record the first individual setting information in a terminal of the first user,
 record the common setting information in a server,
 obtain the first individual setting information recorded in the terminal, and
 obtain the common setting information recorded in the server.

5. The display control system according to claim 1, wherein the at least one processor is configured to:
 set the common setting information based on an operation of an administrative user who is authorized to set the common setting information among the first user and the second user, and
 restrict the setting of the common setting information by an operation of another user who is not the administrative user.

6. The display control system according to claim 1, wherein
 the first user and the second user share a plurality of pieces of the shared information,
 the first individual setting information is associated with each of the plurality of pieces of the shared information, and
 the at least one processor is configured to:
 obtain selected shared information among the plurality of pieces of the shared information,
 obtain the first individual setting information associated with the selected shared information, and
 cause to be displayed the selected shared information on the first display based on the first individual setting information associated with the selected shared information.

7. The display control system according to claim 1, wherein the first individual setting information indicates first display layout or first design setting of the shared information, and
 wherein the second individual setting information indicates second display layout or second design setting of the shared information.

8. The display control system according to claim 1, wherein the shared information is displayed in the same table or spreadsheet.

9. The display control system according to claim 1, wherein the first individual setting information is stored by a cookie of each of the plurality of browsers.

10. A display control method comprising:
 obtaining shared information shared by a first user and a second user;
 obtain common setting information related to a display setting of the shared information and common to the first user and the second user;
 obtaining first individual setting information specified by a first user, the first individual setting information being related to first display setting of a first part of the shared information;
 obtaining second individual setting information specified by the second user, the second individual setting information being related to a second display setting of a second part of the shared information;
 displaying the first part on a first display of the first user based on the first individual setting information;
 display a third part of the shared information on the first display based on the common setting information, the third part being a part other than the first part;

displaying the second part on a second display of the second user based on the second individual setting information; and display a fourth part of the shared information on the second display of the second user based on the common setting information, the fourth part being a part other than the second part, wherein the first part and the third part, displayed on the first display, and the second part and the fourth part displayed on the second display, are configured to be displayed at a same time;

wherein the first individual setting information is associated with each of a plurality of browsers used by the first user wherein the first individual setting information is different for each browser, and the at least one processor is configured to:

obtain the first individual setting information associated with a browser selected by the first user among the plurality of browsers, and cause to be displayed the shared information on the first display based on the first individual setting information associated with the browser selected by the first user.

11. A non-transitory information storage medium that causes a computer to:

obtain shared information shared by a first user and a second user;

obtain common setting information related to a display setting of the shared information and common to the first user and the second user;

obtain first individual setting information specified by a first user, the first individual setting information being related to first display setting of first part of the shared information;

obtain second individual setting information specified by the second user, the second individual setting information being related to a second display setting of a second part of the shared information;

cause to be displayed on a first display of the first user, the first part, which is based on the first individual setting information;

cause to be displayed on a first display, a third part of the shared information which is based on the common setting information, the third part being a part other than the first part;

cause to be displayed on a second display of the second user the second part, which is based on the second individual setting information; and cause to be displayed on a second display of the second user, a fourth part of the shared information which is based on the common setting information, the fourth part being a part other than the second part, wherein the first part and the third part, displayed on the first display, and the second part and the fourth part displayed on the second display, are configured to be displayed at a same time;

wherein the first individual setting information is associated with each of a plurality of browsers used by the first user wherein the first individual setting information is different for each browser, and the at least one processor is configured to:

obtain the first individual setting information associated with a browser selected by the first user among the plurality of browsers, and cause to be displayed the shared information on the first display based on the first individual setting information associated with the browser selected by the first user.

* * * * *